(12) United States Patent
Summers et al.

(10) Patent No.: US 6,722,383 B2
(45) Date of Patent: Apr. 20, 2004

(54) VARIABLE FUNCTION VOTING SOLENOID-OPERATED VALVE APPARATUS AND TESTING METHOD THEREFOR

(76) Inventors: Angela Summers, Houston Solutions, L.L.C, 2323 Clear Lake City Blvd., PMB-295, Houston, TX (US) 77062-8032; Bryan Zachary, Houston Solutions, L.L.C., 2323 Clear Lake City Blvd., PMB-295, Houston, TX (US) 77062-8032

( * ) Notice: Subject to any disclaimer, the term of this patent is extended or adjusted under 35 U.S.C. 154(b) by 494 days.

(21) Appl. No.: 09/756,844

(22) Filed: Jan. 9, 2001

(65) Prior Publication Data

US 2002/0091451 A1 Jul. 11, 2002

(51) Int. Cl.$^7$ ................................................ E03B 1/00
(52) U.S. Cl. ............................ 137/1; 700/275; 700/282
(58) Field of Search ................................ 700/275, 282, 700/301, 19; 137/1, 557; 251/26, 30.01; 60/403

(56) References Cited

U.S. PATENT DOCUMENTS

| | | | | |
|---|---|---|---|---|
| 5,665,898 A | * | 9/1997 | Smith et al. | 73/1.72 |
| 6,155,282 A | * | 12/2000 | Zachary et al. | 137/1 |
| 6,435,202 B2 | * | 8/2002 | Zachary et al. | 137/1 |
| 6,505,501 B1 | * | 1/2003 | Murphy et al. | 73/37 |

* cited by examiner

Primary Examiner—Wilbert L. Starks, Jr.
Assistant Examiner—Ronald D Hartman, Jr.

(74) Attorney, Agent, or Firm—Raymond R. Ferrera; Arnold & Ferrera LLP

(57) ABSTRACT

A variable function voting solenoid-operated valve apparatus is provided having both high safety availability and high plant reliability that does not require a plant system to be bypassed during testing. Also provided is a variable function voting solenoid-operated valve apparatus wherein initiation of a safety action will occur only if each of a pair of operatively associated solenoid-operated valves in the apparatus are actuated, and wherein either of the solenoid valves can singly default to a pre-designated safety action without inadvertently actuating the process valve and isolating or venting the process fluid. Also provided is a variable function voting solenoid-operated valve apparatus wherein either a "1 out of 1 with hot stand-by" operational mode or a "2 out of 2 with high diagnostics" operational mode may be selected by an operator using a logic control system depending on the technical requirements of a given plant environment. Also provided is a variable function voting solenoid-operated valve apparatus, wherein a plurality of pressure sensing devices are incorporated to detect failure of either of a pair of operatively associated solenoid-operated valves so as to prevent inadvertent initiation of a safety action, and wherein a bypass switch is provided to allow on-line maintenance of the device should one of the solenoid valves fail during operation or when a failure is detected during a testing cycle. Finally, a variable function voting solenoid-operated valve apparatus is provided, wherein diagnostic information on the performance of the safety action, a partial movement of the process valve can be executed to prove the process valve is capable of actuating to the safe state, can be ascertained with either operational mode using a logic control system depending on the technical requirements of a given plant environment.

19 Claims, 2 Drawing Sheets

| TRUTH TABLE FOR SOLENOID INDICATION | | | |
|---|---|---|---|
| NORMAL | PRESSURE SWITCH 1 | PRESSURE SWITCH 2 | PRESSURE SWITCH 3 |
| BOTH SOVs ENERGIZED | O | O | CL |
| BOTH SOVs De-ENERGIZED | CL | CL | CL |
| SOV 1 De-ENERGIZED ONLY | CL | O | CL |
| SOV 2 De-ENERGIZED ONLY | O | CL | CL |
| BYPASS | O | O | O |

CL = PRESSURE SWITCH CONTACT IS CLOSED
O = PRESSURE SWITCH CONTACT IS OPEN

*FIG. 2*

VARIABLE FUNCTION VOTING SOLENOID-OPERATED VALVE APPARATUS AND TESTING METHOD THEREFOR

CROSS-REFERENCE TO RELATED APPLICATIONS

Not Applicable

STATEMENT REGARDING FEDERALLY SPONSORED DEVELOPMENT

Not Applicable

BACKGROUND OF THE INVENTION

1. Field of the Invention

The present invention relates generally to voting solenoid-operated valve devices for testing and controlling industrial process systems, and more particularly to a variable function voting solenoid-operated valve apparatus that provides low-cost, high-reliability testing and control of a fluid media processing or manufacturing plant.

2. Background of the Invention

Modern process or manufacturing plants consist of innumerable individual components. These components are integrated to form operational systems controlled by instrumentation and control systems consisting of a variety of sensors and controllers. The operational and control systems serve not only to achieve desired process conditions and parameters, but also to allow a plant facility to safely modify or discontinue operation of all or a portion of the plant's systems and components in order to avoid predetermined deleterious activities and conditions.

For example, safety systems or configurations require routine testing and maintenance in order to verify their continued proper performance with respect to the plant functions for which they were intended. From both an operational and economic vantage, it is highly desirable that such safety systems or configurations should not unnecessarily modify or discontinue operation of the plant systems or components being monitored. One manner in which such safety systems or configurations function is by the isolation or venting of certain process fluids when an unsafe operating condition has been detected by the safety system or configuration. Depending on a particular processing or manufacturing plant's intended operational parameters, this isolation and/or venting of process fluids can be accomplished by actuating process valves. When these process valves are pneumatically actuated spring return type valves, either applying pressure or venting pressure to the valve actuator will move the valve to the open or closed position. One of the means by which pneumatic supply is controlled to the process valves is through the use of one or more solenoid-operated valves.

In function, the solenoid-operated valves of such safety systems or configurations serve to initiate a process whereby a fluid or pneumatic supply is either applied to or vented from the process valve actuator when one or more operatively associated solenoid-operated valves changes state or position in a predetermined manner, e.g., when the solenoid-operated valve is de-energized by the logic control system. The plant processing system and any subservient system or component controlled thereby is then placed in an operational configuration pre-designated as a "safety action".

It is frequently the case that testing and maintenance of an individual solenoid valve should be accomplished without initiating the safety action, thereby avoiding an undesired modification or discontinuance of the plant process system being monitored. However, most prior solenoid valve configurations have necessarily required a trade-off by operators between either discontinuing safety monitoring during testing and maintenance or risking false initiations of the safety action as a result of limited or incomplete testing and maintenance.

For example, a "1 out of 1" solenoid-operated valve configuration is well-known in the art wherein a single solenoid-operated valve is employed for activating the system's safety action by actuating process valves upon detection of an unsafe condition. Such configurations can achieve high plant safety availability when solenoid-operated valve operation is regularly tested by de-energizing the solenoid-operated valve and then monitoring a venting of the fluid or pneumatic supply through an exhaust body such as an anodized aluminum or composite material manifold or the like. Since the process valve and ultimately the plant process system (or its constituent components) may be affected by such venting, testing of the solenoid-operated valve can only be performed under plant bypass conditions, wherein the fluid or pneumatic supply is allowed to pass directly to the process valve or its constituent components by means of a bypass valve. When the solenoid-operated valve is bypassed for testing, the safety action (actuation of the process valve) intended to avoid the unsafe condition cannot be initiated by the solenoid-operated valve.

In practice, the overall safety availability performance of a 1 out of 1 solenoid-operated valve is therefore limited by the percentage of operational time required in a bypass state for testing and maintenance. Moreover, such configurations can achieve only relatively low plant system reliability outside of testing and routine maintenance, since an unexpected component failure within the solenoid-operated valve, for example, a coil failure, will necessarily cause an inadvertent venting or isolation of the fluid or pneumatic supply, i.e., actuation of the process valve and initiation of the safety action.

A "1 out of 2" solenoid-operated valve configuration is also known wherein correct functioning of only one of a pair of solenoid-operated valves connected in operative association is required to actuate the process valve and initiate the safety action. Since only one of the solenoid-operated valves is required to actuate the process valve, relatively high plant safety availability is inherently provided.

Moreover, such a configuration does not require the high testing frequency of the 1 out of 1 solenoid-operated valve system; however, routine testing and maintenance of the device are still required for ordinary safety applications. Similar to the 1 out of 1 solenoid valve, the 1 out of 2 configuration typically requires bypassing the system's safety action during testing. Accordingly, the device is incapable of actuating te process valve, and of isolating or venting the process fluid supply in response to an unsafe condition while the system is in bypass mode. Thus, the safety availability performance of the 1 out of 2 solenoid is also limited by the percentage of operational time required for bypassing and testing. Moreover, since there are two discrete solenoids capable of initiating the safety action, a failure in a single solenoid-operated valve coil can lead to the inadvertent actuation of the process valve and isolation or venting of the process fluid.

A "2 out of 2" configuration has also been employed wherein both solenoid-operated valves must correctly function to actuate the process valve and initiate the safety action. Since both solenoid-operated valves must function properly, high plant system reliability is readily obtained. However, since the likelihood of individual component failure within the solenoid-operated valve system is effectively doubled (for example, both solenoid-operated valves must always function properly), the configuration suffers from relatively low safety availability unless function-tested very frequently. Also, initiation of the safety action is again prevented during testing and maintenance because the plant system must be bypassed for such functions, wherein the fluid or pneumatic supply is allowed to pass directly to the process valve or its constituent components by means of a bypass valve. When the solenoid-operated valves are bypassed for testing, the safety action, actuation of the process valve, intended to avoid the unsafe condition cannot be initiated by the solenoid-operated valves. The testing and maintenance cycle is generally time and manpower intensive since most of the known 2 out of 2 configurations are still tested manually. As with the previously discussed solenoid-operated valve systems, therefore, the safety availability performance of the device is limited by the percentage of operational time required during bypassing and testing or maintenance.

A more sophisticated approach has involved a "2 out of 3" voting solenoid-operated valve system wherein two out of three solenoid-operated valves must operate properly to actuate the process valve and isolate or vent the process fluid. The configuration achieves high safety availability since only two of the three solenoid-operated valves must function to initiate a safety action, and high plant system reliability since two of the three solenoid-operated valves must experience a coil failure or the like for an inadvertent actuation of the process valve and isolation or venting of the process fluid supply to occur. The safety availability is also superior to the previously discussed solenoid systems insofar as the device can be tested or maintained without bypassing the safety action.

In practice, however, those of skill in the pertinent arts have found that the use of three solenoid-operated valves substantially increases the overall price of the system. Moreover, additional logic control system input and output points are required relative to simpler configurations, and thus installation and operating expenses are also increased. In short, the high costs associated with the 2 out of 3 solenoid configuration have virtually negated its effective industrial utility.

Finally, elaborate "quad-voting" configurations have also been attempted wherein both high safety availability and high plant system reliability are reportedly achieved. However, the use of four solenoid-operated valves in a voting configuration has been found to require an unusually large amount of space to accommodate its complex pneumatic tubing, and such complexity obviously increases the associated capital and installation costs. Perhaps even more importantly, many commercial operators of voting solenoid-operated valve systems have been found to particularly disfavor the complex quad-voting configuration because of the elevated potential for testing and maintenance error associated therewith.

3. Objects of the Invention

In view of the foregoing, an object of the present invention is to provide a variable function voting solenoid-operated valve apparatus having both a high safety availability and high plant system reliability that does not require a plant system to be bypassed during testing and maintenance. A further object of the invention is to provide a variable function voting solenoid-operated valve apparatus wherein actuation of the process valve and isolation or venting of the process fluid will occur only if both solenoid-operated valves in a system are actuated, and wherein either of the solenoid-operated valves can default to the safety action without inadvertently actuating the process valve and isolating or venting the process fluid. A still further object of the invention is to provide a variable function voting solenoid-operated valve apparatus wherein either a "1 out of 1 with hot stand-by" mode or a "2 out of 2 with high diagnostics" mode may be selected by an operator using a known logic control system depending on the technical requirements of a given plant environment. A still further object of the invention is to provide a variable function voting solenoid-operated valve apparatus wherein a plurality of pressure sensing devices are incorporated to detect failure of either of a pair of operatively associated solenoid-operated valves so as to prevent inadvertent initiation of a safety action, and wherein a bypass valve is provided to allow on-line maintenance of the device should one of the solenoid-operated valves or pressure sensing devices fail during operation or when a failure is detected during a testing or maintenance cycle. A still further object of the invention is to provide a means to partially initiate the safety action, without undesired modification or disruption of the plant process system being monitored, providing diagnostic information on the safety action.

BRIEF SUMMARY OF THE INVENTION

According to one aspect of the present invention, a variable function voting solenoid-operated valve apparatus useful for testing and controlling industrial process systems by actuating process valves is provided wherein the apparatus comprises a first solenoid-operated valve and a second solenoid-operated valve; a bypass valve; and a plurality of pressure sensing devices including a first pressure sensor in fluid communication with said first solenoid-operated valve, a second pressure sensor in fluid communication with said second solenoid-operated valve, and a third pressure sensor in fluid communication with said bypass valve.

In a presently preferred embodiment of the invention, a variable function voting solenoid-operated valve apparatus is provided comprising a first solenoid-operated valve and a second solenoid-operated valve, wherein actuation of the process valve and therefore the safety action is provided by means of a pneumatic supply to actuate the process valve being directed by the solenoid-operated valve apparatus, and electrical control of said first and second solenoid-operated valves is provided by means of a logic control system or processor; a bypass valve actuated by a key-switch; a valve manifold, wherein said first and second solenoid-operated valves and said bypass valve are joined by said valve manifold; and a plurality of pressure switches including a first pressure switch in fluid communication with said first solenoid-operated valve, a second pressure switch in fluid communication with said second solenoid-operated valve, and a third pressure switch in fluid communication with said key-switch actuated bypass valve. In a further embodiment of the invention, the present variable function voting solenoid apparatus is controlled by a logic control system or processor, wherein said logic control system selectively enables an operator to select between one of at least two discrete apparatus operational modes. In a still further embodiment of the invention, an operator of the apparatus may select from discrete operational modes including a 1 out of 1 with hot stand-by mode (hereinafter referred to as "1oo1-HS") and a 2 out of 2 with high diagnostics mode (hereinafter referred to as "2oo2-D"). In a further embodiment of the invention, the present variable function voting solenoid apparatus can be used in either operational mode ("1oo 1-HS" or "2oo2-D") to partially initiate the safety action to provide diagnostic information on the systems capability to achieve the safety action.

BRIEF DESCRIPTION OF THE DRAWINGS

FIG. 2 is a truth table summarizing operation of the plurality of pressure switches according to a further aspect of the invention.

DETAILED DESCRIPTION OF THE INVENTION

Figure 1:
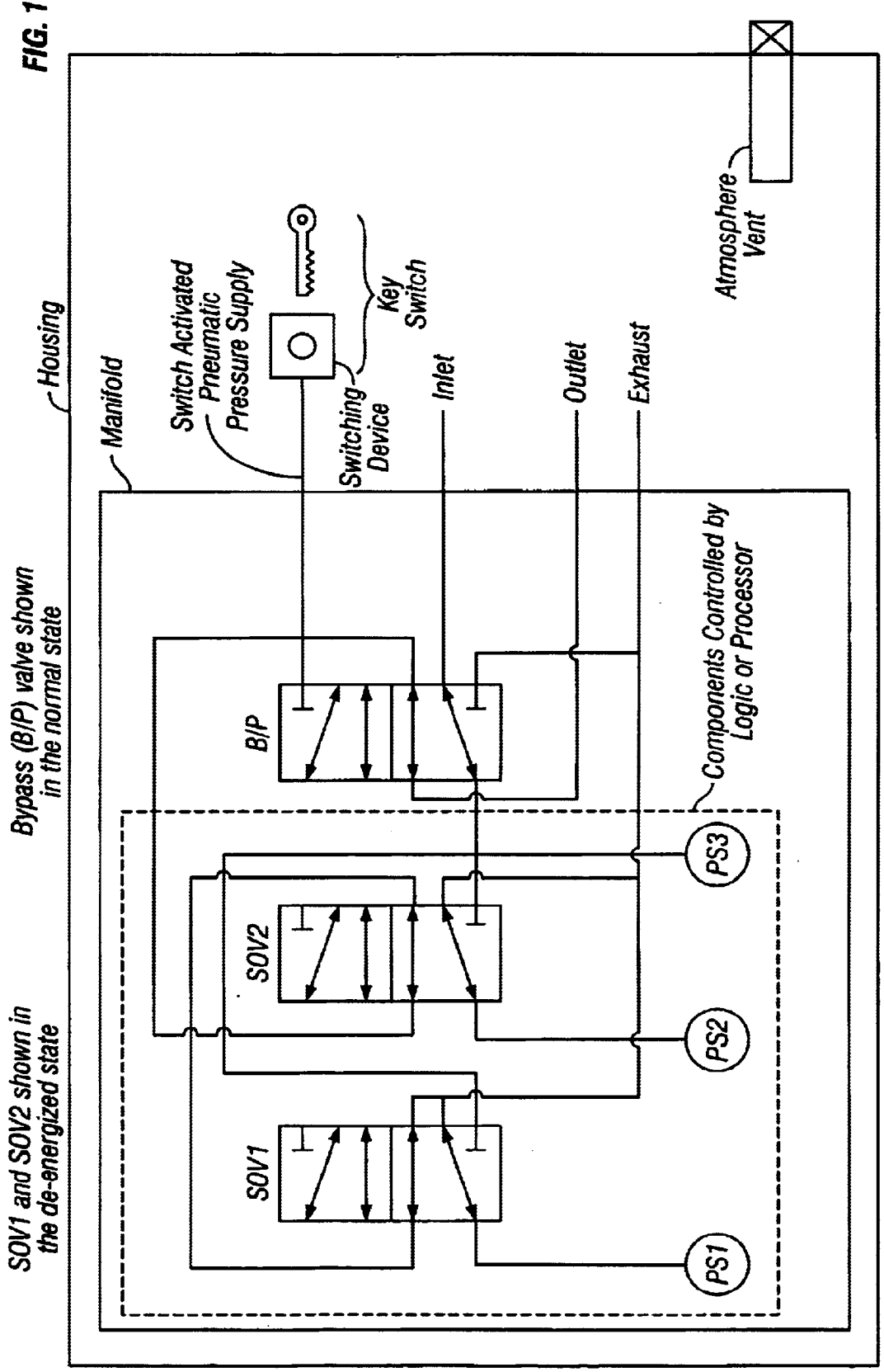
FIG. 1 is a schematic representation of one aspect of the present invention.

The use of dual solenoid-operated valve configurations (generally a combination of 1 out of 2 and 2 out of 2 operational modes) is well known by those of skill in the pertinent arts, but the technical trade-off between high safety availability (in the 1 out of 2 mode) and high plant system reliability (in the 2 out of 2 mode) remains unacceptably problematic. The enhanced dual configuration described below is intended to provide a new and useful hybrid solution wherein both high safety availability and high plant system reliability are maintained. The overall assembly, hereinafter collectively referred to as the "package", employs two solenoid-operated valves functioning in cooperative association with a plurality of pressure switches, wherein an operator may, by means of a preprogrammed logic control system, selectively enable either of two unique operational modes, namely, a 2 out of 2 with high diagnostics mode (2oo2-D) or a 1 out of 1 with hot-standby mode (1oo1-HS).

For example, and referring now to attached FIG. 1, a schematic representation of a variable voting solenoid-operated valve apparatus according to one aspect of the present invention is provided wherein a steel apparatus enclosure 10 houses a first solenoid-operated valve 1 and a second solenoid-operated valve 2; a switch actuated bypass valve 3; and a plurality of pressure switches PS1, PS2 and PS3, including a first pressure switch PS1 in fluid communication with first solenoid-operated valve 1, a second pressure switch PS2 in fluid communication with second solenoid-operated valve 2, and a third pressure switch PS3 in fluid communication with switch actuated bypass valve 3. According to a further aspect of the invention, the solenoid-operated valve package is controlled using a known logic control system that will selectively enable an operator to select from at least two operational modes, including a 2oo2-D mode and a 1oo1-HS mode.

In the 2oo2-D operational mode, a plant can retain the benefits of the standard 2oo2 solenoid configurations previously described, but also realize improved safety availability since the package can be tested or maintained without being bypassed prior to initiation of the testing. During normal operations, each of solenoid-operated valves 1 and 2 are actuated by electromotive force provided by means of the logic control system or processor (not shown), the contacts for pressure switches PS1 and PS2 are opened, and the contact for pressure switch PS3 is closed. When an unsafe condition is detected and a safety action initiated (such as venting or isolation of the fluid), the process valve is actuated when both of solenoid-operated valves 1 and 2 are immediately de-energized, thereby transferring the pneumatic supply to exhaust port 4. In one embodiment of the invention, transfer of the pneumatic source is facilitated by means of a manifold (also not shown). Due to the loss of pneumatic pressure in each of solenoid-operated valves 1 and 2, pressure switches PS1 and PS2 sense a decrease in pressure and close their respective contacts.

For a test sequence, solenoid-operated valve 1 is de-energized and the closed state of pressure switch PS1 is confirmed by the logic control system. Then, solenoid-operated valve 1 is re-energized and the open state of pressure switch PS1 is confirmed. Next, solenoid-operated valve 2 is de-energized and the closed state of pressure switch PS2 is confirmed. Finally, solenoid-operated valve 2 is re-energized and the open state of pressure switch PS2 is confirmed. Completion of this routine renders an accurate testing of each of the solenoid-operated valves 1 and 2 by means of their respective pressure switches without requiring bypassing of the package. A truth table summarizing each of the possible operational states of pressure switches PS1, PS2 and PS3 in the 2oo2-D configuration is provided in FIG. 2.

In this mode, the ability to initiate a safety action (i.e., a venting or isolation of the process fluid) is never compromised during testing, since each of solenoid-operated valves 1 and 2 could immediately be de-energized at any time during the cycle. Unlike the standard 2oo2 configuration, therefore, no bypassing of the package prior to initiation of testing is required.

The 1oo1-HS configuration utilizes the same package as the 2oo2-D, but the operational mode is distinctly different. In this mode, one solenoid-operated valve is actuated by electromotive force provided by means of the logic control system or processor (not shown), during normal operations, while the other solenoid-operated valve remains de-energized and in a stand-by state. In FIG. 1, each of solenoid-operated valves 1 and 2 are shown. Either solenoid-operated valve could be in the energized state, while the other is in a de-energized, stand-by state. The choice of which solenoid is energized and which is in stand-by mode may be alternated or otherwise varied over time.

For illustrative purposes only, assume that solenoid-operated valve 1 is in an energized state. Solenoid-operated valve 2 is therefore in a de-energized state. If a safety action such as isolation or venting of the process fluid is initiated, solenoid 1 is de-energized, thereby routing the pneumatic supply to exhaust port 4. Correct functioning of solenoid-operated valve 1 is then confirmed by pressure switch PS1.

If solenoid-operated valve 1 is faulty and experiences, for example, a coil failure, solenoid-operated valve 1 will initiate a safety action and move to the venting state. Pressure switch PS1 will then close in response to the decrease in pneumatic supply pressure. The logic control system or processor receiving the pressure switch information from pressure switch PS1 will detect that solenoid-operated valve 1 has moved to a vent state inadvertently (i.e., a fault detection). The logic control system or processor will then immediately energize solenoid-operated valve 2, thereby transferring the fluid or pneumatic supply to the plant system or constituent component. In this manner, inadvertent initiation of the safety action is aborted, and plant system reliability is therefore improved.

For a test sequence, solenoid-operated valve 2 is energized, resulting in solenoid-operated valves 1 and 2 operating simultaneously in an energized state. Pressure switches PS1 and PS2 are confirmed open by the logic control system or processor. Solenoid-operated valve 1 is then de-energized and the closed state of pressure switch PS1 is confirmed. Solenoid-operated valve 1 is then re-energized and the open state of pressure switch PS1 is confirmed. Solenoid-operated valve 2 is then de-energized and the closed state of pressure switch PS2 is confirmed. The test routine of the package is completed when the logic control system returns solenoid-operated valve 2 to its previous stand-by state.

It should be noted that at no time during a testing or fault detection cycle is the safety availability of the package compromised. To the contrary, when a safety action such as a venting or isolation of the process fluid is required, the logic control system or processor can immediately de-energize both of solenoid-operated valves 1 and 2 and actuate the process valve, thereby initiating either the venting or isolation action, and package safety availability is maintained.

A switch-actuated bypass valve is also provided in the package, and may include, for example, a key switch for secured manual operation. The bypass function is provided to allow maintenance on the package without interruption of the plant system. This aspect of the invention includes a bypass valve 3 which routes the pneumatic supply directly to the desired plant system or constituent component. The state of bypass valve 3 is detected by pressure switch PS3. When bypass valve 3 is moved or set in the bypass position, pressure switch PS3 opens and indicates to the logic control system or processor that the package is in bypass mode. Such bypassing is required only for maintenance, so loss of access to the safety action is minimized.

The 2oo2-D and 1oo1-HS operational modes described above uniquely provide improved, variable functionality and greater operator flexibility than any other known voting solenoid-operated valve configuration. The package's superior testing and maintenance characteristics and fault detection capabilities provide maximum safety availability while maintaining high plant system reliability.

When the operator of the invention desires diagnostic information related to the performance of the safety action, a partial movement of the process valve can be executed to prove the process valve is capable of actuating to the safe state. Either operational mode (2oo2-D and 1oo1-HS) provides the capability of executing the test of the performance of the safety action.

In the 2oo2-D operational mode, the safety action test is performed by de-energizing solenoid-operated valve 1, then de-energizing solenoid-operated valve 2 for a pre-determined time period. At the conclusion of the pre-determined time period, both solenoid-operated valve 1 and solenoid-operated valve 2 are energized to prevent undesired modification or disruption of the plant process system being monitored, while providing diagnostic information on the safety action. Either solenoid-operated valve could be de-energized first, while the other is de-energized second. In preventative maintenance routines, the choice of which solenoid is de-energized first and which is de-energized second may be alternated or otherwise varied over time. The test routine of the safety action is completed when the logic control system returns solenoid-operated valve 1 and solenoid-operated valve 2 to the energized state.

As discussed previously, in the 1oo1-HS operational mode, the operator of the invention determines which solenoid-operated valve is in the energized state and which solenoid-operated valve is in the de-energized state.

For illustrative purposes, assume solenoid-operated valve 1 is energized and solenoid-operated valve 2 is de-energized.

The safety action test would be initiated by de-energizing solenoid-operated valve 1 for a pre-determined time period, which is sufficient to demonstrate the performance of the safety action without undesired modification or disruption of the plant process system being monitored, while providing diagnostic information on the safety action. At the conclusion of the pre-determined time period, solenoid-operated valve 1 and solenoid-operated valve 2 would be energized to ensure that the process system is returned to normal operational state. When the normal operational state is confirmed, solenoid-operated valve 2 is de-energized. The test routine of the package is completed when the logic control system returns solenoid-operated valve 2 to its previous stand-by state.

The foregoing detailed description of the invention is intended primarily for illustrative purposes, and is not intended to include all possible aspects of the present invention. Moreover, while the invention has been shown and described with respect to an exemplary embodiment, those of skill in the pertinent arts should appreciate that the foregoing detailed description, and various other modifications, omissions and additions, so long as in the general form and detail thereof, may be made without departing from either the spirit or scope of the present invention. Having thus described the invention,

What is claimed is:

1. A variable function voting solenoid-operated valve apparatus useful for testing and controlling industrial process systems, the apparatus comprising:

a first solenoid-operated valve and a second solenoid-operated valve;

a bypass valve;

a plurality of pressure sensors, including a first pressure sensor in fluid communication with said first solenoid-operated valve, a second pressure sensor in fluid communication with said second solenoid-operated valve, and a third pressure sensor in fluid communication with said bypass valve; and a logic control system, wherein said logic control system selectively enables an operator of said variable function voting solenoid-operated valve apparatus to select one of at least two discrete operational modes, wherein said at least two discrete operational modes includes a 1-out-of-1 with hot stand-by mode and a 2-out-of-2 with high diagnostics mode.

2. The variable function voting solenoid-operated valve apparatus of claim 1, wherein when said apparatus is selected to operate in a 2-out-of-2 with high diagnostics mode, testing of said apparatus may be performed without bypassing said apparatus prior to initiation of testing.

3. The variable function voting solenoid-operated valve apparatus of claim 1, wherein when said apparatus is selected to operate in a 1-out-of-1 with hot standby mode, testing of said apparatus may be performed without bypassing said apparatus prior to initiation of testing.

4. The variable function voting solenoid-operated valve apparatus of claim 1, wherein a switching device directs a pneumatic pressure supply to said bypass valve in order to initiate a safety action, wherein said safety action comprises a venting of process pressure to an atmospheric vent.

5. The variable function voting solenoid-operated valve apparatus of claim 4, wherein said pneumatic pressure supply further comprises dry instrument air.

6. The variable function voting solenoid-operated valve apparatus of claim 4, wherein said pneumatic pressure supply further comprises a fluid pneumatic supply.

7. The variable function voting solenoid-operated valve apparatus of claim 1, wherein said bypass valve is actuated by a switching device.

8. The variable function voting solenoid-operated valve apparatus of claim 7, wherein said switching device comprises a key switch.

9. The variable function voting solenoid-operated valve apparatus of claim 1, wherein said apparatus further comprises a manifold.

10. The variable function voting solenoid-operated valve apparatus of claim 9, wherein said manifold is comprised of aluminum.

11. The variable function voting solenoid-operated valve apparatus of claim 9, wherein said manifold is comprised of anodized aluminum.

12. The variable function voting solenoid-operated valve apparatus of claim 9, wherein said manifold is comprised of a composite material.

13. The variable function voting solenoid-operated valve apparatus of claim 9, wherein said manifold is comprised of a steel material.

14. The variable function voting solenoid-operated valve apparatus of claim 1, wherein said apparatus further comprises an enclosed housing.

15. The variable function voting solenoid-operated valve apparatus of claim 14, wherein said apparatus further comprises an enclosed steel housing.

16. The variable function voting solenoid-operated valve apparatus of claim 14, wherein said apparatus further comprises an enclosed composite material housing.

17. A variable function voting solenoid-operated valve apparatus useful for testing and controlling industrial process systems, the apparatus comprising:

a first solenoid-operated valve and a second solenoid-operated valve;

a switch activated bypass valve;

a valve manifold, wherein said first and second solenoid-operated valves and said switch actuated bypass valve are joined by said manifold;

a plurality of pressure sensors, including a first pressure sensor in fluid communication with said first solenoid-operated valve, a second pressure sensor in fluid communication with said second solenoid-operated valve, and a third pressure sensor in fluid communication with said switch activated bypass valve; and a logic control system, wherein said logic control system selectively enables an operator of said variable function solenoid-operated valve apparatus to select one of at least two discrete operational modes, and wherein said at least two discrete operational modes includes a 1-out-of-1 with hot stand-by mode and a 2-out-of-2 with high diagnostics mode.

18. The variable function solenoid-operated valve apparatus of claim 17, wherein when said apparatus is selected to operate in a 2-out-of-2 with high diagnostics mode, testing of said apparatus may be performed without bypassing said apparatus prior to initiation of testing.

19. The variable function solenoid-operated valve apparatus of claim 17, wherein when said apparatus is selected to operate in a 1-out-of-1 with hot stand-by mode, testing of said apparatus may be performed without bypassing said apparatus prior to initiation of testing.

* * * * *